US005554206A

United States Patent [19]

Czermak et al.

[11] Patent Number: 5,554,206
[45] Date of Patent: Sep. 10, 1996

[54] METHOD OF CHARGING ORE

[75] Inventors: Karl Czermak, Enns; Konstantin Milionis, Georgen a/d Stiefling; Gero Tessmer, Linz, all of Austria; Roy H. Whipp, Jr., Miami, Fla.

[73] Assignees: Voest-Alpine Industrieanlagenbau GmbH, Austria; Brifer International Ltd., Barbados

[21] Appl. No.: 398,562

[22] Filed: Mar. 3, 1995

[30] Foreign Application Priority Data

Mar. 4, 1994 [AT] Austria ........................................ 465/94

[51] Int. Cl.⁶ ................................................. C21B 13/00
[52] U.S. Cl. ........................... 75/446; 266/142; 266/172; 266/176
[58] Field of Search ............................ 266/44, 172, 176, 266/142; 75/446

[56] References Cited

U.S. PATENT DOCUMENTS

| | | | |
|---|---|---|---|
| 4,207,093 | 6/1980 | Pastorino | 75/26 |
| 4,377,278 | 3/1983 | Barmann | 266/176 |
| 4,437,796 | 3/1984 | Ulveling et al. | 266/176 |
| 5,082,251 | 1/1992 | Whipp | 266/172 |
| 5,129,630 | 7/1992 | Ariyama et al. | 75/446 |

FOREIGN PATENT DOCUMENTS 0629708  5/1981  European Pat. Off. .
0027909 12/1994  European Pat. Off. .
3201608  9/1982  Germany .

OTHER PUBLICATIONS

Journal of Metals, Apr. 1957, pp. 586–590, "The H–Iron Process".

*Primary Examiner*—Scott Kastler
*Attorney, Agent, or Firm*—Ostrolenk, Faber, Gerb & Soffen, LLP

[57] ABSTRACT

A method of and apparatus for charging fine-grained ore into a reactor pressure vessel through which process gas flows. The heated ore at first is introduced into a conveying pressure vessel, is pressurized within the same by compressed gas and subsequently is conveyed into the reactor pressure vessel through a conveying duct by aid of the compressed gas. In order to ensure favorable utilization of the reactor pressure vessel under uniform stress and to safeguard troublefree progression of reduction while directly charging the ore, a portion of the ore is introduced into at least one further conveying pressure vessel and is pressurized within the same also by compressed gas. Charging of the ore into the reactor pressure vessel is effected continuously by alternately feeding once from the one conveying pressure vessel and subsequently from the other conveying pressure vessel. The compressed gas is taken from the process gas as a quantitative or as a component portion of the process gas and is fed back to the same along with the ore.

16 Claims, 1 Drawing Sheet

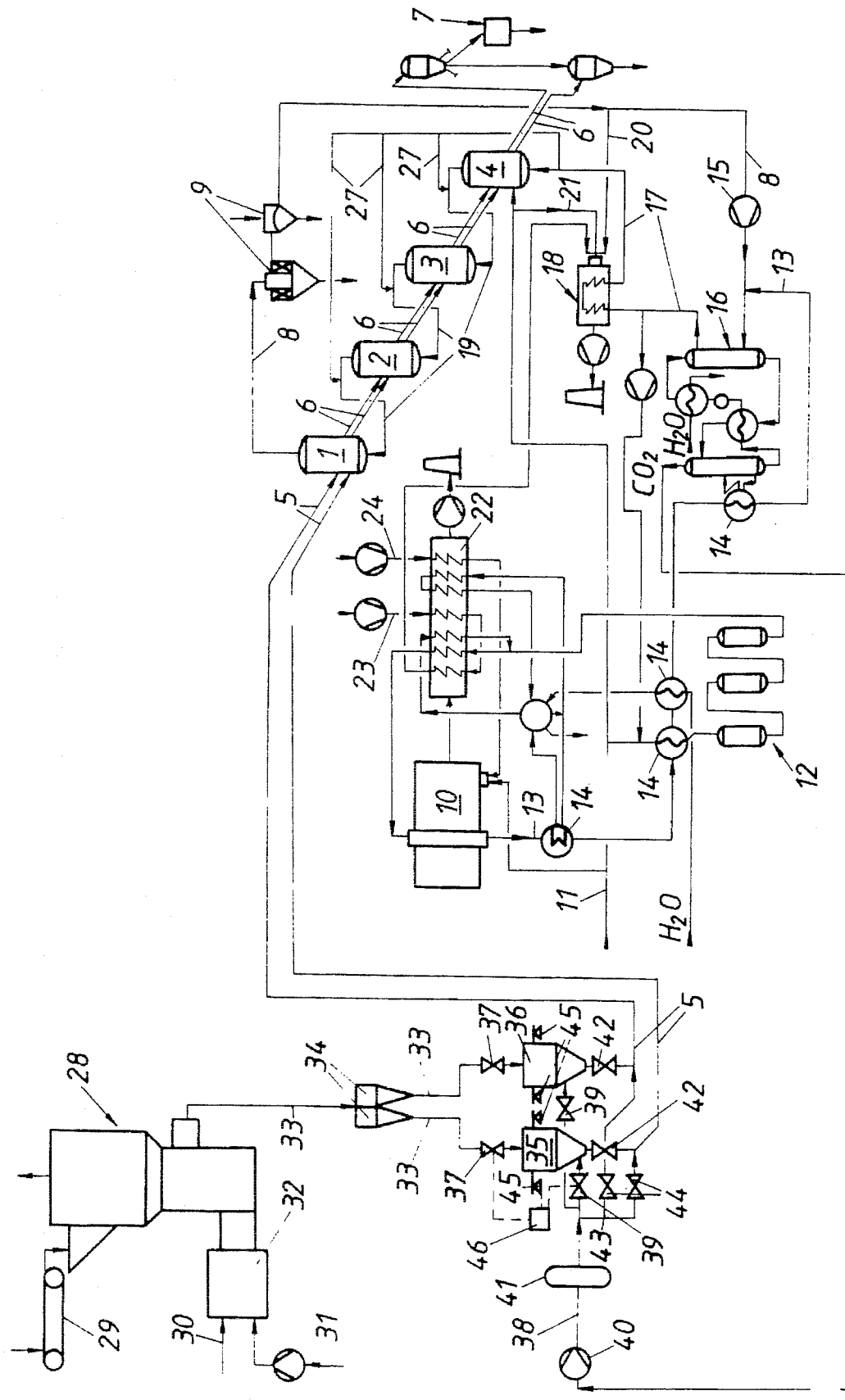

METHOD OF CHARGING ORE

BACKGROUND OF THE INVENTION

1. Field of the Invention

The invention relates to a method of charging fine-grained ore, in particular iron ore, into a reactor pressure vessel through which process gas flows, wherein the ore at first is introduced into a conveying pressure vessel, is pressurized within the same by means of a compressed gas and subsequently is conveyed into the reactor pressure vessel through a conveying duct by means of the compressed gas, as well as an arrangement for carrying out the method.

2. Description of the Related Art

It is known to provide a pressurized sluice system for charging fine-grained iron ore into a reactor pressure vessel (U.S. Pat. No. 5,082,251). In doing so, the fine ore at first is filled into a pressure vessel, which, upon closure of the feed duct to the reactor pressure vessel, is brought to the pressure of the pressure reactor. After this, the outlet duct to the reactor pressure vessel is opened and the fine ore flows into the reactor pressure vessel by means of gravity. Charging in this manner may be effected both at ambient temperature and at elevated temperatures. The spatial arrangement of such pressurized sleuce systems is possible only above the pressure reactors because of the utilization of gravity. This calls for a large structural height of the whole system and hence for great structural expenditures as well as complex conveying means.

From the Journal of Metals, April 1957, pp. 586 to 590, "The H-Iron Process", a method of the initially defined kind is known, in which hot fine ore is introduced into a conveying pressure vessel pneumatically via a collecting tank. As soon as the conveying pressure vessel has been filled, it is pressurized by means of hydrogen gas, which, in that case, serves as the process gas for the reduction of iron ore, whereupon the conveying duct between the conveying pressure vessel and the reactor pressure vessel is opened. As a result, the fine ore flows into the reactor pressure vessel within a short span of time. Such discontinuous charging adversely affects the reduction process. Nonuniform qualities are obtained, and the reactor pressure vessel is unevenly stressed at an unfavorable utilization factor.

From EP-A-0 027 909 an arrangement for continuously conveying fine-grained stock, such as coal dust, is known, which comprises two pressure vessels to be alternately filled and emptied pneumatically, from which the stock to be conveyed is continuously supplied to the consumer by aid of compressed air. The compressed air used is ambient air fed via a compressor to the conveying ducts conveying the stock to be conveyed and, thus, to the coal dust consumer. The apparatus is complicated and does not provide continuous operation of a reactor vessel.

SUMMARY OF THE INVENTION

The invention aims at avoiding these disadvantages and difficulties and has as its object to provide a method of the initially defined kind as well as an arrangement for carrying out the method, which enable the troublefree progression of the reduction occurring within the reactor pressure vessel at the optimum utilization of the capacity of the reactor pressure vessel while saving as much compressed gas, and as much gas to be moved through the reactor pressure vessel, as possible.

In accordance with the invention, a portion of the ore is introduced into at least one further conveying pressure vessel and is pressurized within the same also by means of a compressed gas, and charging of the ore into the reactor pressure vessel is effected continuously by alternately feeding once from the one conveying pressure vessel and subsequently from the further conveying pressure vessel, and wherein the compressed gas is taken from the process gas as a quantitative or as a component portion of the process gas and is fed back to the same along with the ore.

Due to the better utilization of the reactors according to the invention, the throughput through the same can be considerably increased. In addition, the mode of operation of a reactor pressure vessel that is continuously charged as according to the invention is substantially simplified, since the circuitry required in discontinuous operation no longer is necessary. Thus, in total, a great economic advantage is achieved in addition to a considerably simplified process.

According to the invention, further simplification of the process can be achieved by conducting the process gas at least partially in circulation including the reactor pressure vessel.

Advantageously, $CO_2$ is used as the compressed gas, which is taken from the process gas of the process occurring within the reactor pressure vessel by means of $CO_2$ scrubbing. The advantage of using $CO_2$ as the conveying gas primarily resides in that it is not combustible and, thus, does not interfere with, or influence, the process proceeding within the reactor pressure vessel. Moreover, it cart be separated again, thus remaining available.

Suitably, reducing gas that serves to reduce the are also may be used as the compressed gas for conveying the ore from the conveying pressure vessels into the reactor pressure vessel.

Advantageously, the compressed gas is pre-compressed to a pressure of up to 20 bars and is injected into the conveying pressure vessels while balancing out existing pressure fluctuations.

To precisely determine the amount conveyed, the conveying pressure vessels advantageously are continuously weighed, and the alternate feeding from one of the conveying pressure vessels and the filling of one of the conveying pressure vessels, respectively, are effected via a control loop as a function of the measured weights of the conveying vessels, the range of control being coordinated with the range of application provided in each case.

An arrangement for carrying out the method according to the invention, comprising a drier and a preheater for the ore, a conveying pressure vessel consecutively arranged via an ore supply duct, into which a compressed-gas duct enters and from which a conveying duct departs, running into the reactor pressure vessel, is characterized in that at least one further conveying pressure vessel is provided, wherein the ore supply duct is capable of being flow-connected alternately with the one or with the further conveying pressure vessel, that each of the conveying pressure vessels is capable of being connected with the reactor pressure vessel by a conveying duct, and that a compressed-gas duct is capable of being flow-connected alternately with each of the conveying pressure vessels by means of shut-off devices, wherein the compressed-gas duct is flow-connected with the reactor pressure vessel via the conveying pressure vessels and the conveying ducts under formation of a circulatory system.

Advantageously, the compressed-gas duct additionally is capable of being flow-connected alternately with each of the conveying ducts leading from the conveying pressure vessels into the reactor pressure vessel, by means of shut-off devices.

To safeguard uniform conveyance, a compressor and an equalizing reservoir balancing out pressure fluctuations suitably are provided in the compressed-gas duct.

To determine the amount of ore conveyed, the conveying pressure vessels, according to a preferred embodiment, are provided with a weighing means, and shut-off devices provided in the compressed-gas duct as well as in the ore supply duct are connected with the weighing means via a control means.

Suitably, the conveying ducts leading from the conveying pressure vessels to the reactor pressure vessel are provided internally with heat-resistant wear protection and externally with thermal insulation.

BRIEF DESCRIPTION OF THE DRAWING

The sole drawing FIGURE is a schematic flow diagram of a reduction plant illustrating a method and arrangement according to a preferred embodiment of the present invention.

DETAILED DESCRIPTION OF THE PREFERRED EMBODIMENTS

In the following, the invention will be explained in more detail by way of an exemplary embodiment illustrated in the drawing.

The arrangement according to the invention comprises four reactor pressure vessels consecutively arranged in series and configured as whirl layer reactors 1 to 4, wherein iron-oxide-containing material, such as fine ore, is conducted to the first whirl layer reactor 1 via a conveying duct 5 and from one whirl layer reactor to another whirl layer reactor via conveying ducts 6, the completely reduced material (sponge iron) being hot- or cold-briquetted in a briquetting plant 7. If required, the reduced iron is protected from re-oxidation during briquetting by an inert-gas system not illustrated.

Reducing gas is conducted from one whirl layer reactor 4 to the other whirl layer reactors, 3 to 1, consecutively, in counter-flow relative to the ore flow and is withdrawn from the last whirl layer reactor 1, viewed in the gas flow direction, as a top gas via a top-gas discharge duct 8 and is cooled and scrubbed in a wet scrubber 9. The production of the reducing gas is effected by reforming in a reformer 10 natural gas supplied through a duct 11 and desulfurized in a desulfurization plant 12. The reformed gas formed of natural gas and vapor essentially consists of $H_2$, CO, $CH_4$, $H_2O$ and $CO_2$. This reformed gas is fed through a reformed-gas duct 13 to several heat exchangers 14, in which it is cooled to ambient temperature, water thus being condensed out of the gas.

The reformed-gas duct 13 runs into the top-gas discharge duct 8 after the top gas has been compressed by means of a compressor 15. The mixed gas thus forming is passed through a $CO_2$-scrubber 16 and freed from $CO_2$, then being available as reducing gas. This reducing gas, through a reducing-gas feed duct 17, is heated to a reducing-gas temperature of about 800° C. in a gas heater 18 arranged to follow the $CO_2$-scrubber 16 and is fed to the first whirl layer reactor 4, viewed in the gas flow direction, where it reacts with the fine ores to produce directly reduced iron. The whirl layer reactors 4 to 1 are arranged in series; the reducing gas gets from one whirl layer reactor to another whirl layer reactor through connection ducts 19.

A portion of the top gas is sleuced out of the gas circulatory system 8, 17, 19 in order to avoid the enrichment of inert gases, such as $N_2$. The sleuced-out top gas is fed through a branch duct 20 to the gas heater 18 for heating the reducing gas and is burned there. Possible shortages of energy are supplemented by natural gas supplied through a feed duct 21.

The sensible heat of the reformed gas emerging from the reformer 10 as well as of the reformer smoke gases is utilized in a recuperator 22 to preheat the natural gas after passage of the same through the desulfurization plant 12, to produce the vapor required for reforming and to preheat the combustion air supplied to the gas heater through duct 23 as well as, if desired, also the reducing gas. The combustion air supplied to the reformer 10 through duct 24 is preheated as well.

In order to keep the reaction temperature constant at one and the same level in all of the whirl layer reactors 1 to 4 and thereby achieve a further reduction of the energy demand, hot and fresh reducing gas is directly fed through branch ducts 27 to the whirl layer reactors 1 to 3 arranged to follow the first whirl layer reactor 4, viewed in the flow direction of the reducing gas, in amounts of approximately 10% per whirl layer reactor 1, 2 and 3. Thus, the whirl layer reactors 1 to 4, in terms of reducing gas control, are arranged not only in series, but, as regards the supply of a slight portion of the reducing gas, also in parallel, whereas the whirl layer reactors 1 to 4, as regards the withdrawal and transmission of the reducing gas exclusively are arranged in series in the embodiment illustrated.

Prior to introducing the fine ore into the first reactor pressure vessel 1 designed as a whirl layer reactor, the fine ore is subjected to ore preparation, such as screening and drying as well as, suitably, to preheating. For drying, a whirl layer drier-preheater 28 is provided, in which the fine ore not only is dried, but also is preheated to 300° to 700° C. To this whirl layer drier-preheater 28 the fine ore is supplied via a conveying belt 29 and the heating gas 30, along with air 31, is supplied via a burner 32. The hot fine ore is supplied to an intermediate container 34 through an ore supply duct 33 and from there gets into two conveying pressure vessels 35, 36 via valves 37, i.e., facultatively into one of them each. The conveying pressure vessels 35, 36 are each flow-connectable with a $CO_2$ compressed-gas duct 38 via valves 39, wherein a compressor 40 compressing the $CO_2$ to approximately 20 bars and a consecutively arranged equalizing reservoir 41 are provided in the $CO_2$ compressed-gas duct 38. The equalizing reservoir balances out short-term pressure fluctuations occurring due to the alternate bleeding of $CO_2$. As is apparent from the drawing, the $CO_2$ conveying gas is taken from the reduction process, i.e., from the $CO_2$ scrubber 16 in a manner so as to be conducted in circulation in the process.

From each of the two conveying pressure vessels 35, 36, a conveying duct 5 departs, which conveying ducts are individually connectable with the first reactor pressure vessel 1 in a duct-like manner via valves 42.

The $CO_2$ compressed-gas duct 38 departing from the equalizing reservoir 41 includes a branching 43 so as to be connectable in a duct-like manner via valves 44 with one conveying duct 5 each for conveying the fine ore into the first reactor pressure vessel 1. Each of the conveying pressure vessels 35, 36 rests on weighing cells 45 of a weighing means communicating with the valves 39, 44 of the compressed-gas duct as well as with the valves 37 and 42 provided in the ore supply duct 33 and in the conveying duct 5, respectively, via a control means 46, as is indicated for some of the valves by broken lines.

The charging arrangement functions in the following manner:

The hot ore is charged into one of the two conveying pressure vessels 35, 36 until the weighing means 45, 46 indicates the complete filling of the respective pressure vessel. After this, the ore supply duct 33 is closed by closing the pertaining valve 37 and the charged conveying pressure vessel, which contains $CO_2$ preheated to 50° to 200° C., is brought to conveying pressure by opening the pertaining valve 39. As soon as the conveying pressure—which is about 20 bars—has been reached, the pertaining valve 42 to conveying duct 5 is opened and the fine ore is introduced into the reactor pressure vessel 1 at a moderate rate.

In the meantime, the second conveying pressure vessel 35, 36 is filled with fine ore such that it will be available for the charging of fine ore after evacuation of the first conveying pressure vessel 35, 36. Due to such moderate charging once from the one and once from the other, conveying pressure vessel 35, 36, it is feasible to supply fine ore continuously to the reactor pressure vessel 1 in a constant amount per time unit. Continuous supply can be realized also with more than two conveying pressure vessels 35, 36.

The conveying duct 5 leading to the reactor pressure vessel 1 inwardly is provided with an heat-resistant wear protection and outwardly is equipped with thermal insulation. To avoid thermal losses, the conveying pressure vessels 35, 36 likewise are heat-insulated. Furthermore, means for supporting thermal expansions are provided. To increase the operational safety, it is also possible to install two independent pressure introduction systems.

$CO_2$ has proved advantageous as a conveying gas, in particular, because is does not interfere with the reducing gas atmosphere prevailing within the reactor pressure vessels, because it can be withdrawn from the process in a simple manner and because it is not combustible.

The specific consumption of conveying gas amounts to 20 to 35 $Nm^3$ $CO_2$ per ton of iron ore. The overall consumption at a conveying performance of 120 t/h amounts to 4,200 $Nm^3/h$ at most. When applying the charging method according to the invention, $CO_2$ is present in the reducing gas in a non-disturbing amount of approximately 2%. However, it is also possible to use other gases occurring in the process as conveying gases.

The advantages achieved according to the invention may be summarized as follows:
high economy due to continuous operation,
better utilization of the reactors and hence achievement of a high throughput,
simplified operation due to a substantial reduction in circuitry,
little demand for equipment as compared to conventional systems,
low structural height of the reactor building, since charging is effected from the mill floor,
reduction of expenditures in terms of steel structures,
due to preheating of the ore being effected in a pressure-less manner, no expenditures involved for compressing the combustion air required therefor,
use as conveying gas of a gas available in the process,
due to the use of conveying gas incurring in the process, no influence on the reduction process, and
in connection with preceding whirl layer drying and subsequent preheating, favorable energetic efficiency.

By the charging method according to the invention and the pertaining arrangement according to the invention also cold ore may be charged.

The method according to the invention and the arrangement according to the invention may be used not only for the above-described reduction process in which the reducing gas is largely conducted in circulation, but also for other reduction processes, for instance, those in which the reducing gas flows through the reactor pressure vessel only once.

What we claim is:

1. A method of charging fine-grained ore into a reactor pressure vessel through which process gas flows, comprising the steps of:

providing a first conveying pressure vessel means;

introducing a first portion of the ore into said first conveying pressure vessel means;

providing compressed gas, said compressed gas being taken from said process gas and fed back to said process gas;

pressurizing said first portion of the ore with said compressed gas;

providing at least one further conveying pressure vessel means;

introducing a second portion of the ore into said at least one further conveying pressure vessel means;

pressurizing said second portion of the ore with said compressed gas; and charging said reactor pressure vessel continuously by alternately feeding said pressurized first portion of the ore from said first conveying pressure vessel means and said pressurized second portion of the ore from said at least one further conveying pressure vessel means into said reactor pressure vessel, said compressed gas taken from said process gas being fed along with said ore.

2. A method as set forth in claim 1, wherein said compressed gas taken from said process gas is a quantitative portion of said process gas.

3. A method as set forth in claim 1, wherein said compressed gas taken from said process gas is an extracted component portion of said process gas.

4. A method as set forth in claim 1, further comprising the step of recirculating said process gas at least partially in said reactor pressure vessel.

5. A method as set forth in claim 1, wherein $CO_2$ is used as said compressed gas, said $CO_2$ being taken from the process gas of the process occurring within said reactor pressure vessel by $CO_2$ scrubbing.

6. A method as set forth in claim 1, wherein said ore includes iron and reducing gas for reducing said iron is used as said compressed gas for conveying said ore from said conveying pressure vessel means into said reactor pressure vessel.

7. A method as set forth in claim 1, wherein said compressed gas is pre-compressed to a pressure of up to 20 bars and is introduced into said conveying pressure vessel means while balancing out existing pressure fluctuations.

8. A method as set forth in claim 1, further comprising continuously weighing said conveying pressure vessel means so as to obtain a measured weight and effecting alternative feeding from one of said conveying pressure vessel means and filling of one of said conveying pressure vessel means via a control loop as a function of said measured weight of said conveying pressure vessel means.

9. A method as set forth in claim 1, wherein said ore is preheated prior to being charged in said conveying pressure vessel means.

10. An arrangement for charging fine-grained ore into a reactor pressure vessel through which process gas flows, comprising:

a drying means and a preheating means for the ore;

an ore supply duct;

a first conveying pressure vessel means following said drying and preheating means via said ore supply duct, and intended to receive said ore from said drying and preheating means via said ore supply duct;

compressed-gas duct means running into said first conveying pressure vessel means and adapted to feed compressed gas into said first conveying pressure vessel means for pressurizing said ore;

a conveying duct means departing from said first conveying pressure vessel means and running into said reactor pressure vessel for conveying said ore into said reactor pressure vessel by aid of said compressed gas;

at least one further conveying pressure vessel means for receiving ore from said drying and preheating means;

first shut-off means provided in said ore supply duct and adapted to alternately place said ore supply duct into flow-connection with either one of said first and at least one further conveying pressure vessel means;

conveying duct means provided for each of said conveying pressure vessel means, said conveying duct means being adapted to connect each of said conveying pressure vessel means with said reactor pressure vessel;

second shut-off means provided in said compressed-gas duct means and adapted to alternately place said compressed-gas duct means into flow-connection with either one of said first and further conveying pressure vessel means, said compressed-gas duct means being in flow-connection with said reactor pressure vessel via said conveying pressure vessel means and said conveying duct means under formation of a circulatory system such that said ore is supplied continuously to said reactor pressure vessel along with said compressed gas.

11. An arrangement as set forth in claim 10, further comprising third shut-off means provided in said compressed-gas duct means and adapted to alternately place said compressed-gas duct into flow-connection with each of said conveying duct means leading from said conveying pressure vessel means into said reactor pressure vessel.

12. An arrangement as set forth in claim 10, further comprising a compressor and an equalizing reservoir provided in said compressed-gas duct means, said equalizing reservoir being adapted to balance out pressure fluctuations.

13. An arrangement as set forth in claim 10, further comprising weighing means provided for determining the weight of each of said conveying pressure vessel means, and a control means responsive to said weight determined by said weighing means for regulating said first shut-off means provided in said ore supply duct and said second shut-off means provided in said compressed-gas duct means.

14. An arrangement as set forth in claim 10, further comprising a heat-resistant wear protection means provided internally on said conveying duct means leading from said conveying pressure vessel means to said reactor pressure vessel and an insulation means provided externally on said conveying duct means leading from said conveying pressure vessel means to said reactor pressure vessel.

15. A method as set forth in claim 1, wherein said reactor pressure vessel is a whirl-layer reactor.

16. A arrangement as set forth in claim 10, wherein the reactor pressure vessel is a whirl-layer reactor.

* * * * *